Patented Nov. 11, 1947

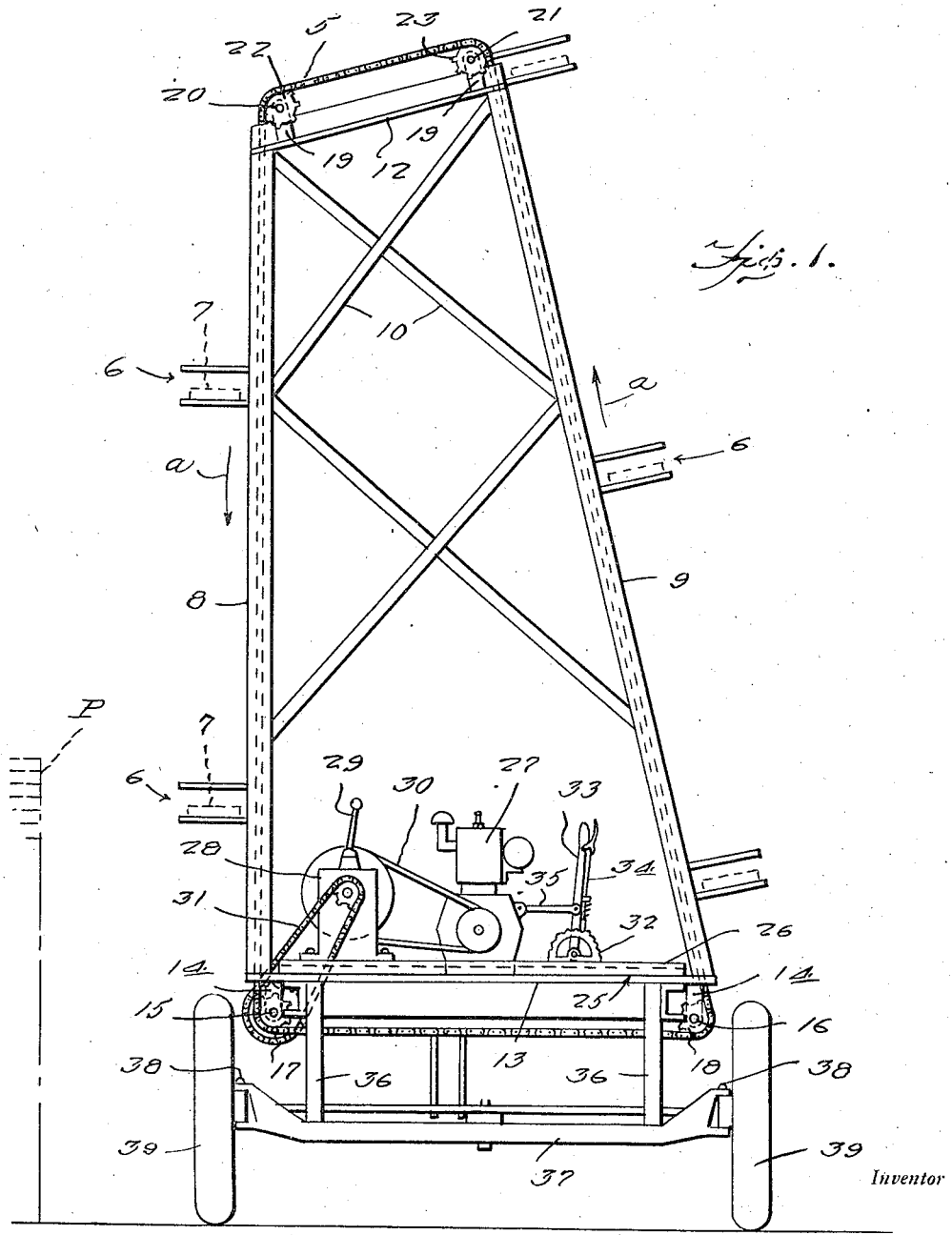

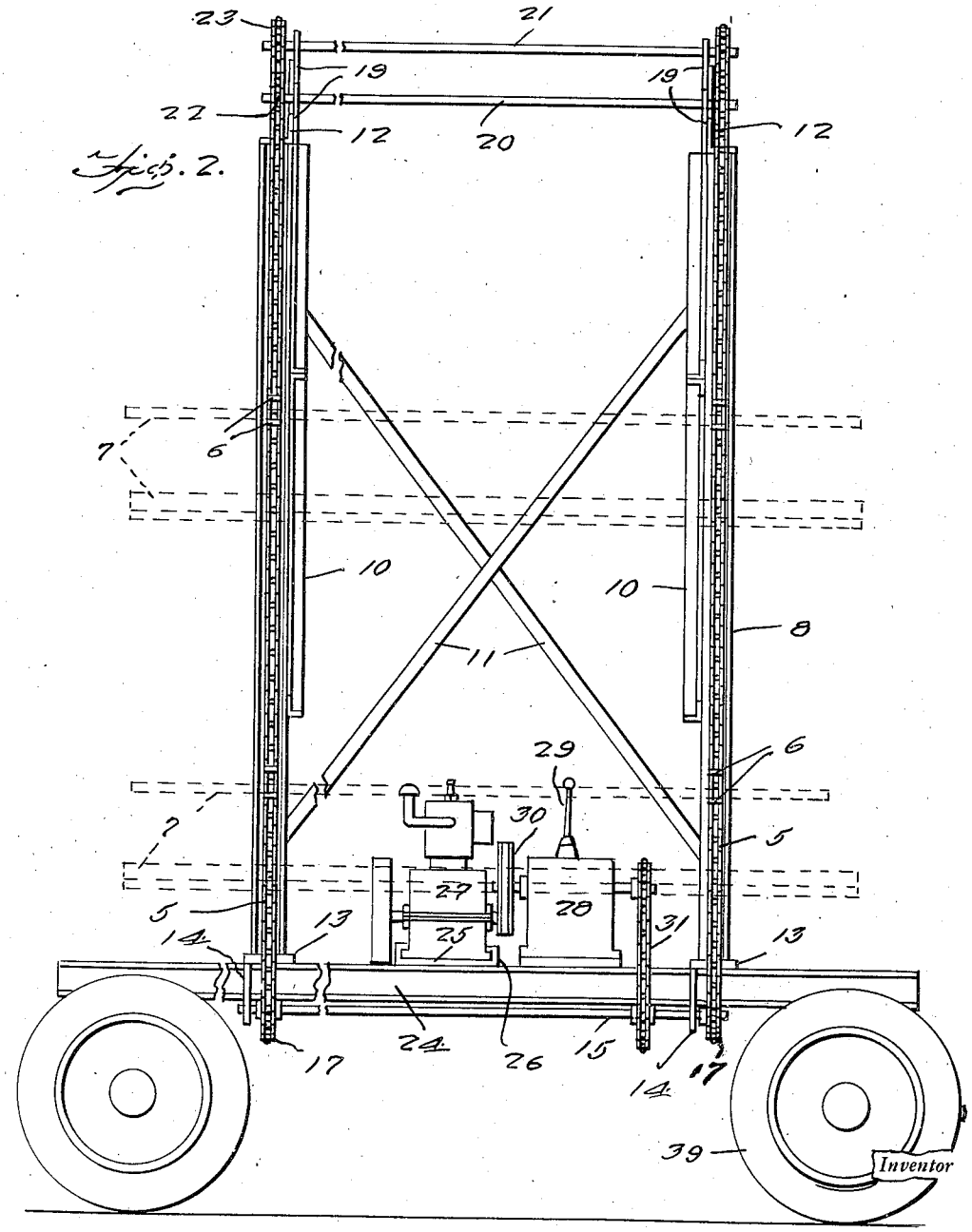

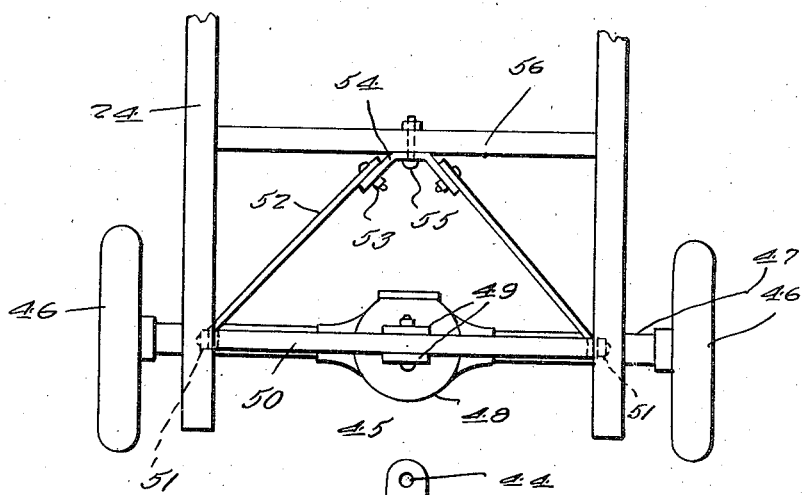
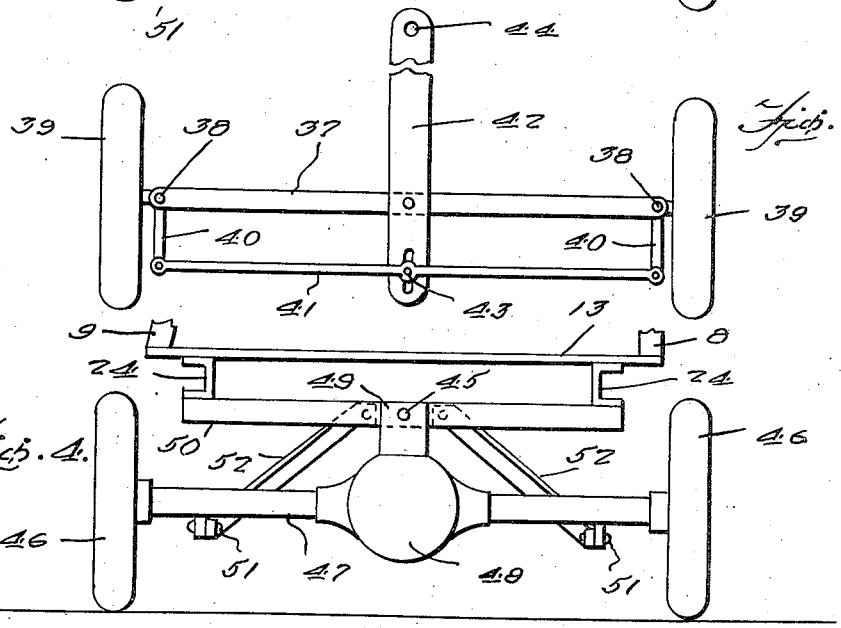

2,430,689

UNITED STATES PATENT OFFICE 2,430,689

LUMBER HANDLING MACHINE

Owen L. Shook, Keysville, Va.

Application October 27, 1944, Serial No. 560,601

1 Claim. (Cl. 198—154)

This invention relates to a machine for handling or conveying lumber so as to facilitate stacking or piling of the latter.

More particularly, the present invention relates to a lumber handling machine of the type which includes a substantially rectangular frame within which is incorporated a pair of continuous conveyor chains having pairs of carriers, the chains and carriers being adapted to transport pieces of lumber from a receiving point to a delivery or stacking point, the path of movement of the carriers being upward past the receiving point and downward past the delivery or stacking point, and the elevation of the receiving and delivery points varying as the quantity of lumber at the receiving point diminishes and the quantity of lumber at the delivery or stacking point increases.

An important object of the present invention is to provide a lumber handling machine of the above kind which is readily portable and particularly well adapted for use in lumber yards, the machine being readily towable from point to point where its use may be required.

A further object of the invention is to provide a lumber handling machine of the above kind which is comparatively simple, compact and durable in construction, easy to use and control, and highly efficient in use.

More specific objects and features of the invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is a front elevational view of a lumber handling machine constructed in accordance with the present invention.

Figure 2 is a side elevational view thereof, partly broken away and looking toward the right of Figure 1.

Figure 3 is a fragmentary plan view showing details of the running gear at the rear end of the machine.

Figure 4 is a rear elevational view of the construction shown in Figure 3, and

Figure 5 is a view similar to Figure 3 of the running gear at the front end of the machine.

Referring more in detail to the drawings, the present invention includes a substantially rectangular vertically elongated frame, within which is incorporated a pair of continuous conveyor chains 5 having pairs of horizontally aligned carriers 6, the chains and carriers being adapted to transport pieces of lumber 7 from a receiving station at the right hand side of the machine, as viewed in Figure 1, to a delivery or stacking station at the left hand side of the machine, as viewed in Figure 1. These receiving and delivery stations or points will vary as to elevation as the supply of lumber at the receiving side of the machine diminishes and the pile of lumber at the delivery side of the machine increases. The path of movement of the carriers 6 is upward past the receiving point and downward past the delivery point, as indicated by the arrows *a* in Figure 1. The supply of lumber to be stacked may be upon the ground or on a lumber car at one side of the machine, while the lumber may be piled on the ground or upon a car or truck at the other or delivery side of the machine.

A frame to support the conveyor chains and to accommodate the shafts and sprocket wheels for guiding and driving the chains may be constructed with four corner members 8, 8, and 9, 9, two corner members 8 and 9 on each side of the conveyor being associated with one of the conveyor chains 5, and being interconnected across the frame by diagonal braces 10. Also, the two corner members 8 at one side of the machine and the two corner members 9 at the other side of the machine are interconnected by further diagonal braces 11. As shown, the corner members 8 at the delivery side of the machine are preferably vertical, while the corner members 9 at the receiving side of the machine are preferably inclined upwardly toward the corner members 8 and extends slightly above the latter so that the upwardly moving flight of the conveyor is inclined to effectively insure retention of the pieces of lumber in the carriers 6 and to provide an upper flight of the conveyor which is inclined toward the delivery side of the machine for insuring turning of the pieces of lumber over from one side to the other thereof as they move from the receiving side of the machine to the delivery side thereof at the top of the frame. At this point, it is appropriate to mention the fact that each carrier 6 merely consists of a pair of spaced arms projecting from the associated conveyor chain at right angles to the latter and adapted to readily receive the piece of lumber therebetween with the latter extending transversely of the carrier arms and the conveyor chains, as shown in Figures 1 and 2. The corner members 8 and 9 merely consist of channel irons disposed with their flanges projecting outwardly, the chains 5 being movable in the channel irons between the flanges thereof. At the top, the corner members 8 and 9 at each side of the conveyor are connected by inclined bars 12, while horizontal cross pieces 13 connect the lower ends of the corner members 8 and 9 at each side of the conveyor. Fixed to and depending from the opposite ends of the cross pieces 13 are shaft hangers 14, in which are journaled the opposite end portions of horizontal shafts 15 and 16 respectively having sprocket wheels 17 and 18 secured thereon and about which the conveyor chains 5 pass in traveling horizontally from the delivery side of the machine to the receiving side thereof at the bottom of the frame. Other shaft hangers 19 are fixed upon the opposite ends of the bars 12 at the top of the frame, and shafts 20 and 21 are journaled in the hangers 19 respectively at the delivery and receiving sides of the machine. The conveyor chains 5 pass over sprocket wheels 22 and 23 respectively secured on the shafts 20 and 21.

The conveyor is mounted and rigidly secured upon a wheeled chassis having a frame which includes side channel rails 24 upon which the cross pieces 13 rest. The cross pieces 13 extend transversely of the frame rails 24 of the chassis and project outwardly beyond said rails 24, as clearly shown in Figure 1.

Extending across and connecting the chassis rails 24 is a supporting base 25 having opposed side guide channels 26 in which is slidably received and retained the base of a motor 27 which is preferably in the nature of an internal combustion engine. Also mounted on the chassis frame to one side of the motor 27, and nearer the delivery side of the machine, is a conventional transmission mechanism 28 having a gear shift lever 29 and embodying the usual gearing which provides for changing of speed and reverse drive. The drive shaft of motor 27 is operatively connected by a belt gearing 30 with the driving shaft of transmission 28, while the driven shaft of transmission 28 is operatively connected by sprocket gearing 31 with the conveyor shaft 15 at the delivery side of the machine. In this way, provision is made for driving the conveyor at different speeds in one direction and at a given speed in a reverse direction. The motor and transmission mechanism are preferably mounted at a point intermediate the sides of the conveyor frame, as shown. Rigid with the supporting base 25 is a ratchet segment 32 with which is associated a swinging hand lever 33 provided with conventional latch means 34 that cooperates with the segment 32 to secure the lever in any desired adjusted position. Lever 33 is located at a point between the motor 27 and the receiving side of the machine, and said lever is connected by a link 35 with the motor 27. The arrangement is such that lever 33 may be operated to shift the motor 27 in a direction away from the transmission mechanism 28 so as to maintain the belt of the belt gearing 30 in a tight condition when driving of the conveyor is desired. By shifting the motor 27 toward the transmission mechanism, the belt of the belt gearing 30 may be loosened so that power is not transmitted from the motor to the conveyor when it is desired to discontinue driving the latter. This tightening or loosening of the driving belt has the same effect as a clutch.

As shown more clearly in Figures 1 and 5, the front end of the chassis frame is supported by standards 36 upon a front axle 37 having horizontally swinging stub axles which are hinged at 38 and carry the front steering and supporting wheels 39 of the machine. The rearwardly projecting steering arms 40 of the stub axles are operatively connected by a tie rod 41, as is conventional in motor vehicle construction. Pivoted intermediate its ends within a slot through the central portion of axle 37 is a draw bar 42 that projects rearwardly of the axle 37 and has a pivotal and slidable connection 43 with the tie rod 41. The forward end of draw bar 42 is apertured at 44 to facilitate hitching of the same to a tractor. The arrangement is such that when the tractor makes a turn, tow bar 42 is actuated to correspondingly turn the wheels 39 about the stub axle pivots 38 so that the machine will be steered in a proper way to follow the direction of travel of the tractor by means of which the machine is being towed.

At the rear end, the chassis frame is pivoted at 45 for tilting laterally relative to the rear supporting wheels 46 about a horizontal axis in line with the longitudinal axis of the chassis. As shown, the wheels 46 are carried on the ends of separate axles journaled in a housing 47 whose enlarged central portion 48 has spaced plates 49 rigid with and projecting upwardly therefrom. The plates 49 receive between them a cross member 50 secured on the under sides of the chassis rails 24. The pivot 45 extends through the plates 49 and the cross bar 50. Also hinged at 51 to the housing 47 at the inner sides of the wheels 46 are forwardly and upwardly extending and forwardly converging radius bars 52 that are hinged at their forward ends at 53 to the rearwardly diverging ends of a U-shaped member 54 pivoted for turning movement about a longitudinal horizontal axis at 55 to a cross member 56 of the chassis frame. The purpose of this construction is to enable the chassis frame and the conveyor mounted thereon to maintain a horizontal position even though a supporting wheel 46 at one side of the machine rests upon the ground at a higher elevation than the wheel 46 at the opposite side of the machine. Manual leveling of the machine is therefore unnecessary even though the ground may be uneven where the machine is placed in use.

In use, the machine is brought to a position beside the supply of lumber with said supply located at the receiving side of the machine or the right hand side thereof, as viewed in Figure 1. The conveyor is then placed in operation, as previously described, to cause the conveyor chains to travel in the direction of the arrows a. As the carriers 6 move upwardly at the receiving side of the machine, the pieces of lumber are taken from the point of supply, one at a time, and placed upon the pairs of carriers. As the pieces of lumber pass laterally at the top of the conveyor, they tilt in their direction of movement and then turn over, first receiving their support from one arm of each carrier and then the other arm of each carrier, as the carriers move downwardly at the delivery side of the machine. As the pieces of lumber come within reach at the delivery side, they are removed from the carriers and piled at the delivery side of the machine, as indicated at P in Figure 1. The speed and movement of the conveyor is controlled as required, and the transfer and piling of the lumber is effected expeditiously and with the expenditure of a minimum amount of manual labor.

Should a piece of lumber pass too quickly, it may be reached and removed by stopping the conveyor and driving it in a reverse direction for the required distance. Ordinarily, however, this will not be found necessary because the speed of travel of the conveyor can be readily regulated to avoid difficulty in removing the pieces of lumber in plenty of time as they approach the delivery point.

From the foregoing description, it is believed that the construction and operation, as well as the advantages, of the present invention will be readily understood and appreciated by those skilled in the art. Minor changes and modifications may be made, such as fairly fall within the scope of the invention as claimed.

What I claim is:

In a lumber handling machine, a wheeled supporting frame, and motor driven lumber elevating conveying means mounted on said supporting frame for transferring lumber from a receiving point at one side of the machine to a delivery point at the other side of the machine, said conveying means including spaced endless conveying chains movable upwardly at an upward and inward inclination at said one side of the machine and downwardly vertically at said other side thereof, and pairs of horizontally aligned carriers fixed at intervals to and projecting outwardly from said chains, each carrier including a pair of spaced parallel arms adapted to receive a piece of lumber therebetween and projecting from the associated chain at right angles to its direction of travel so that said arms are inclined inwardly when moving upwardly at said one side of the machine and are substantially horizontally disposed when moving downwardly at said other side of the machine.

OWEN L. SHOOK.

REFERENCES CITED

The following references are of record in the file of this patent:

UNITED STATES PATENTS

| Number | Name | Date |
| --- | --- | --- |
| 765,409 | Witterich | July 19, 1904 |
| 1,053,391 | Hilke | Feb. 18, 1913 |
| 1,109,408 | Eshleman | Sept. 1, 1914 |
| 1,471,468 | Jackson | Oct. 23, 1923 |
| 1,793,801 | Hinckley | Feb. 24, 1931 |
| 1,856,873 | Kuert | May 3, 1932 |
| 1,948,091 | Alvey et al. | Feb. 20, 1934 |
| 2,017,156 | Mattler | Oct. 15, 1935 |